(12) United States Patent
Fukuda et al.

(10) Patent No.: US 10,642,658 B2
(45) Date of Patent: May 5, 2020

(54) VEHICLE CONTROL APPARATUS

(71) Applicant: Hitachi Automotive Systems, Ltd., Hitachinaka-shi, Ibaraki (JP)

(72) Inventors: Takeshi Fukuda, Tokyo (JP); Fumio Narisawa, Tokyo (JP); Tomohito Ebina, Hitachinaka (JP); Hiroaki Komatsu, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 221 days.

(21) Appl. No.: 15/303,280

(22) PCT Filed: Apr. 22, 2015

(86) PCT No.: PCT/JP2015/062169
§ 371 (c)(1),
(2) Date: Oct. 11, 2016

(87) PCT Pub. No.: WO2015/182295
PCT Pub. Date: Dec. 3, 2015

(65) Prior Publication Data
US 2017/0039091 A1 Feb. 9, 2017

(30) Foreign Application Priority Data

May 26, 2014 (JP) ................. 2014-108387

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01); *G06F 9/5066* (2013.01)

(58) Field of Classification Search
None
See application file for complete search history.

(56) References Cited

U.S. PATENT DOCUMENTS 6,289,488 B1 9/2001 Dave et al.
2004/0250182 A1 12/2004 Lyle et al.
(Continued)

FOREIGN PATENT DOCUMENTS

JP 60-11946 A 1/1985
JP 11-203165 A 7/1999
(Continued)

OTHER PUBLICATIONS

International Search Report (PCT/ISA/210) issued in PCT Application No. PCT/JP2015/062169 dated Aug. 4, 2015 with English translation (Four (4) pages).
(Continued)

*Primary Examiner* — Duy Khuong T Nguyen
*Assistant Examiner* — Melissa A Headly
(74) *Attorney, Agent, or Firm* — Crowell & Moring LLP

(57) ABSTRACT

Provided is a vehicle control apparatus with which it is possible to allocate programs to multiple cores so as to satisfy a deadline even when software programs having two or more control cycles are intermixed. The vehicle control apparatus pertaining to the present invention allocates tasks to processor cores in consideration of the execution order of the tasks, the execution cycles of the tasks, and the cost of communication between the processor cores.

9 Claims, 9 Drawing Sheets

(56) References Cited

U.S. PATENT DOCUMENTS

| | | | | |
|---|---|---|---|---|
| 2006/0074725 A1* | 4/2006 | Huang | ................... | G06Q 10/04 |
| | | | | 717/135 |
| 2007/0110053 A1* | 5/2007 | Soni | ................... | H04L 63/0263 |
| | | | | 370/389 |
| 2008/0263555 A1* | 10/2008 | Ventroux | .............. | G06F 9/4881 |
| | | | | 718/103 |
| 2011/0113431 A1 | 5/2011 | Shidai et al. | | |
| 2011/0239220 A1* | 9/2011 | Gibson | ................ | G06F 1/3206 |
| | | | | 718/103 |
| 2012/0216208 A1 | 8/2012 | Takemura et al. | | |

FOREIGN PATENT DOCUMENTS

| | | | |
|---|---|---|---|
| JP | 11-242614 | A | 9/1999 |
| JP | 2010-277171 | A | 12/2010 |
| JP | 2011-13793 | A | 1/2011 |
| JP | 2011-100338 | A | 5/2011 |
| JP | 2011-198346 | A | 10/2011 |
| JP | 2012-108576 | A | 6/2012 |
| JP | 2012-181852 | A | 9/2012 |
| JP | 2014-52827 | A | 3/2014 |

OTHER PUBLICATIONS

Japanese-language Written Opinion (PCT/ISA/237) issued in PCT Application No. PCT/JP2015/062169 dated Aug. 4, 2015 (Four (4) pages).

Extended European Search Report issued in counterpart European Patent Application No. 15799221.5 dated Apr. 19, 2018 (Twelve (12) pages).

Kopetz, "Real-Time Systems—Design Principles for Distributed Embedded Applications", In: Real-Time Systems Series, Jan. 1, 2011, pp. 1-387, XP055118674.

Chinese-language Office Action issued in counterpart Chinese Application No. 201580024752.4 dated Mar. 7, 2019 with English translation (26 pages).

European Office Action issued in counterpart European Application No. 15 799 221.5 dated May 16, 2019 (12 pages).

Manolache S. et al.., "Task Mapping and Priority Assignment for Soft Real-Time Applications under Deadline Miss Ratio Constraints", ACM Transactions on Embedded Computing Systems, Jan. 29, 2008, vol. 7, No. 2, XP058203739, (35 pages).

* cited by examiner

| TASK | CONTROL CYCLE (ms) | EXECUTION ORDER |
|---|---|---|
| 1 | 10 | - |
| 2 | 5 | 1 |
| 3 | 10 | 1 |
| 4 | 5 | 2 |
| 5 | 5 | 2 |
| 6 | 5 | 4,5 |
| 7 | 10 | 3 |
| 8 | 10 | 6 |
| 9 | 5 | 6 |
| 10 | 10 | 7,8 |

| DEPENDENCY | COMMUNICATION COST ($\mu s$) |
|---|---|
| a | 10 |
| b | 15 |
| ... | |
| h | 30 |
| i | 10 |
| j | 25 |
| k | 5 |

| CONTROL CYCLE OF SUBSEQUENT TASK | CONTROL CYCLE OF PREVIOUS TASK | WEIGHT |
|---|---|---|
| LONG | LONG | 1 |
| LONG | SHORT | 3 |
| SHORT | LONG | 7 |
| SHORT | SHORT | 10 |

| ID | Control cycle of previous task (ms) | Control cycle of subsequent task (ms) | Communication cost (μs) | Weight | Weighted communication cost |
|---|---|---|---|---|---|
| a | 10 | 5 | 10 | 7 | 70 |
| b | 10 | 10 | 15 | 1 | 15 |
| ... | | | | | |
| h | 5 | 10 | 30 | 3 | 90 |
| i | 5 | 5 | 10 | 10 | 100 |
| j | 10 | 10 | 25 | 1 | 25 |

FIG. 10

EXECUTION LOG 201

| | 0μs | 1200μs | 1200μs | 1215μs | ... |
|---|---|---|---|---|---|
| CORE A | START OF TASK 1 | END OF TASK 1 | START OF TASK 2 | DURING EXECUTION OF TASK 2 | ... |
| CORE B | | | COMMUNICATION COST | START OF TASK 3 | ... |

203
204

| TASK | CONTROL CYCLE (ms) |
|---|---|
| 1 | 10 |
| 2 | 5 |
| 3 | 10 |
| 4 | 5 |
| 5 | 5 |
| 6 | 5 |
| 7 | 10 |
| 8 | 10 |
| 9 | 5 |
| 10 | 10 |

202

VEHICLE CONTROL APPARATUS

TECHNICAL FIELD

The present invention relates to a vehicle control apparatus.

BACKGROUND ART

Built-in control devices, which control an object to be controlled by a built-in software, are used in technical fields such as automobiles, elevators and construction machines. The built-in software is advantageous in terms that it is possible to implement flexible and advanced control as compared to the conventional control method employing a mechanical mechanism and an electric circuit.

Recently, such built-in control devices, for example, vehicle control apparatuses have rapidly progressed to have higher performances, and accordingly, an increase in computation amount of a central processing unit (CPU) has been a problem. In order to solve this, there has been an effort to improve the computation amount per unit time by achieving a multi-core configuration or a multi-CPU configuration in which the number of CPU cores is increased.

However, there are a lot of problems in efficient execution of existing software, developed on the premise of a single-core processor, on a multi-core processor. In particular, it is a big problem to establish a task allocation method of parallelizing vehicle control software having a strict constraint on an execution order of a program and allocating the software to a plurality of cores.

PTL 1, which will be described later, describes a technique of efficiently allocating existing vehicle control software that have been developed for a single-core processor to a plurality of cores. In the same literature, an execution order of an existing program is secured by allocating a task to a core in a standby state for processing based on a dependency of the software and a progress status.

PTL 2, which will be described later, describes a technique of improving a real-time performance than the related art by securing a possibility that a task can be executed even when the task which requires a high CPU utilization rate occurs. In the same literature, a CPU utilization rate, which is required for allowing a task to satisfy a time constraint, is calculated based on the time constraint imposed on the task and a required amount of calculation of a real-time task, and the task is allocated such that the calculated CPU utilization, rate is maximized.

CITATION LIST

Patent Literature

PTL 1: Japanese Patent Application Laid-Open No. 2012-108576

PTL 2: Japanese Patent Application Laid-Open No. 2010-277171

SUMMARY OF INVENTION

Technical Problem

There is no consideration relating to handling the software having a plurality of control cycles in the above-described technique of PTL 1. For example, programs having a plurality of control cycles coexist (that is, there are a plurality of the programs to be executed in each different execution cycle) in the software that controls a single system in many cases in the case of the vehicle control software. Since the technique described in PTL 1 does not consider a difference depending on the control cycle, there is a possibility that execution of software having a short control cycle, which is planned to be processed with priority, is delayed over a deadline.

There is no consideration on a dependency of a program in the above-described technique of PTL 2. For example, it is necessary to allocate the task in consideration of the dependency between the programs such as a request for strict satisfaction of a program execution order constraint from acquisition of sensor value information to calculation of a control amount of an actuator in a vehicle control software. Since the technique described in PTL 2 assumes the task having no execution order constraint, it is difficult to properly allocate the software, which has the execution order constraint such as the vehicle control software, to multi-cores.

The present invention has been made in view of the above-described problems, and an object thereof is to provide a vehicle control apparatus that is capable of allocating a program to multi-cores so as to meet a deadline even when two or more control cycles coexist in software.

Solution to Problem

A vehicle control apparatus according to the present invention allocates each task to processor cores in consideration of an execution order of the task, an execution cycle of the task, and a communication cost between the processor cores.

Advantageous Effects of Invention

According to a vehicle control apparatus of the present invention, it is possible to allocate the tasks to the processor cores while meeting each deadline of the tasks even in the case of using a control software in which a plurality of control cycles coexist and the dependency between the tasks is present.

BRIEF DESCRIPTION OF DRAWINGS

FIG. 10 is a diagram illustrating an example of an execution log 201.

DESCRIPTION OF EMBODIMENTS

<Task Allocation in Multi-Cores>

Hereinafter, a description will be given regarding a problem at the time of allocating a task to each processor core in a multi-core processor, first, in order to facilitate understanding of the present invention, and then, an embodiment of the present invention will be described.

Figure 1A:
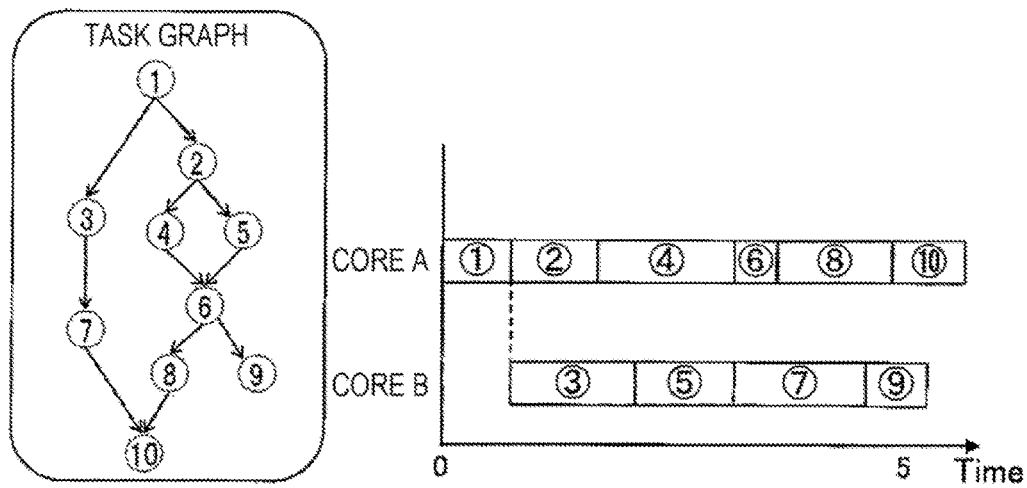
FIGS. 1A and 1B are diagrams schematically illustrating results obtained by allocating a vehicle control software for an existing single core to a processor core.
Figure 1B:
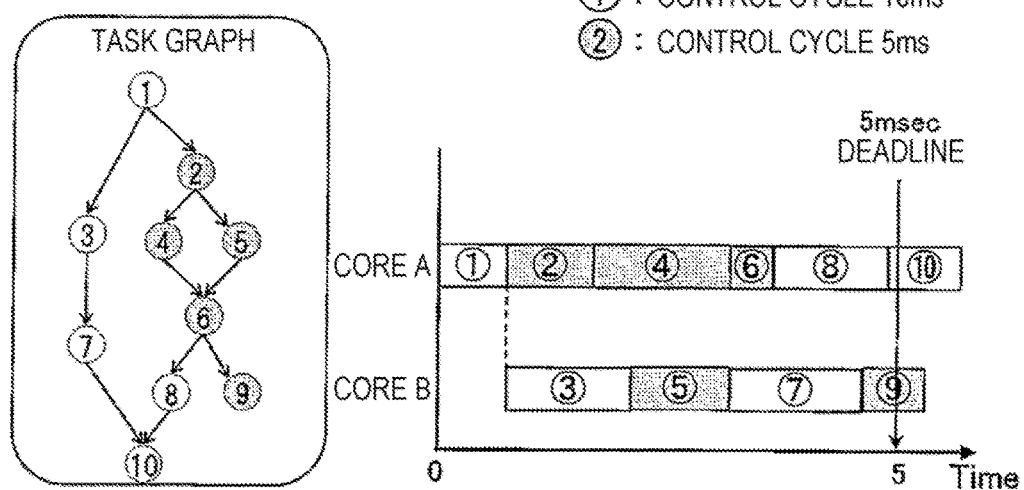

FIGS. 1(a) and 1(b) are diagrams schematically illustrating results obtained by allocating a vehicle control software for an existing single core to a processor core. In FIGS. 1(a) and 1(b), numbers 1 to 10 in the respective circles represent tasks serving as program units forming a cluster. The arrow between the circles represents a dependency between the tasks. The dependency indicates a dependent relationship relating to an execution order of the task or reception and transmission of data. A direction of the arrow is equal to a constraint on the execution order of the program. For example, a task 2 can be executed only after a task 1 is ended. In FIGS. 1(a) and 1(b), it is assumed that there are two cores including a core A and a core B as allocation destinations of the tasks.

FIG. 1(a) illustrates a task allocation result when there is a single execution cycle of the task. The program is allocated to the respective cores based on the dependencies among the tasks so as not to reverse the dependencies indicated by the arrows. As illustrated in a time chart at the time of execution of the program on the right of FIG. 1(a), it is possible to understand that the software is executed in parallel by the two cores, and the entire process is completed in a shorter period of time as compared to the case of using a single core.

FIG. 1(b) illustrates a task allocation result when a plurality of control cycles coexist. The tasks to be executed in each different control cycle coexist in the vehicle control software in many cases, and thus, it is possible to say that FIG. 1(b) reflects more such an actual circumstance of the vehicle control software. In FIG. 1(b), each control cycle of tasks 1, 3, 7, 8 and 10 is 10 ins, and each control cycle of tasks 2, 4, 5, 6 and 9 is 5 ms. As illustrated in a time chart at the time of execution of the program on the right of FIG. 1(b), there is a possibility that processing of a task having a short control cycle, which is planned to be processed with priority, is delayed and may cause failure in meeting a deadline if the task is allocated using a conventional technique when the plurality of control cycles coexist. In FIG. 1(b), the task 9 fails to meet the deadline.

Embodiment of Present Invention

Figure 2:
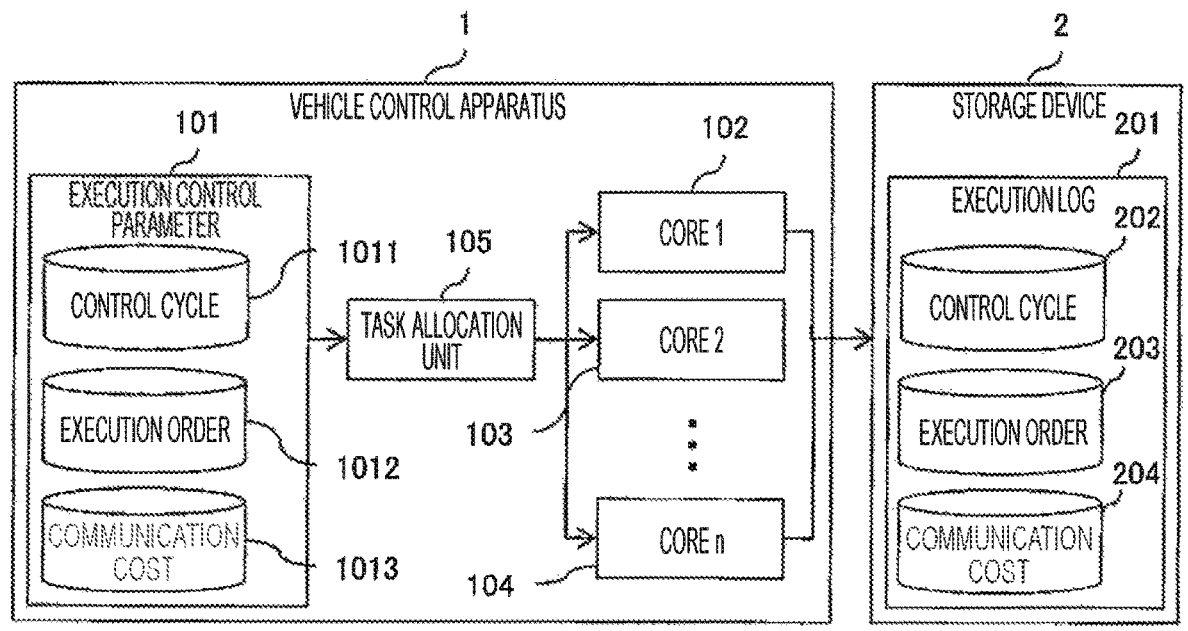
FIG. 2 is a system configuration diagram of a vehicle control apparatus 1 according to the present invention.

FIG. 2 is a system configuration diagram of a vehicle control apparatus 1 according to the present invention. The vehicle control apparatus 1 is provided with a processor including plurality of processor cores (herein, 102 to 104) and a task allocation unit 105. The task allocation unit 105 acquires an execution control parameter 101 and allocates a task to each of the processor cores based on the execution control parameter 101. The processor writes an execution log 201 describing a result of the task allocation in a storage device 2.

The execution control parameter 101 describes information relating to hardware and software which are required for control of a vehicle. To be specific, the execution control parameter 101 describes a multi-core configuration, a bus wiring, a sensor value, a control cycle parameter 1011 of a control software (task), an order of priorities, a deadline, an execution order parameter 1012 of the task, a communication cost parameter 1013 between the cores, and the like.

The control cycle parameter 1011 describes a control cycle of a program (task) to be executed by the processor. The execution order parameter 1012 describes an execution order of the program to be executed by the processor. The execution order described herein includes the dependency between the tasks that has been described in FIGS. 1(a) and 1(b). When it is assumed that it is necessary to perform data communication between the processor cores since a previous task and a subsequent task are executed by the different processor cores, the communication cost parameter 1013 describes a period of time required for the data communication.

The execution log 201 is a log that describes a partial or whole result of computation performed by the cores 102 to 104, and includes a control cycle log 202, an execution order log 203, and a communication cost log 204. The control cycle log 202, the execution order log 203, and the communication cost log 204 correspond to the control cycle parameter 1011, the execution order parameter 1012, and the communication cost parameter 1013, respectively, and describe each log relating to the control cycle, the execution order, and a communication cost when each of the processor cores actually executes the task.

Figure 3:
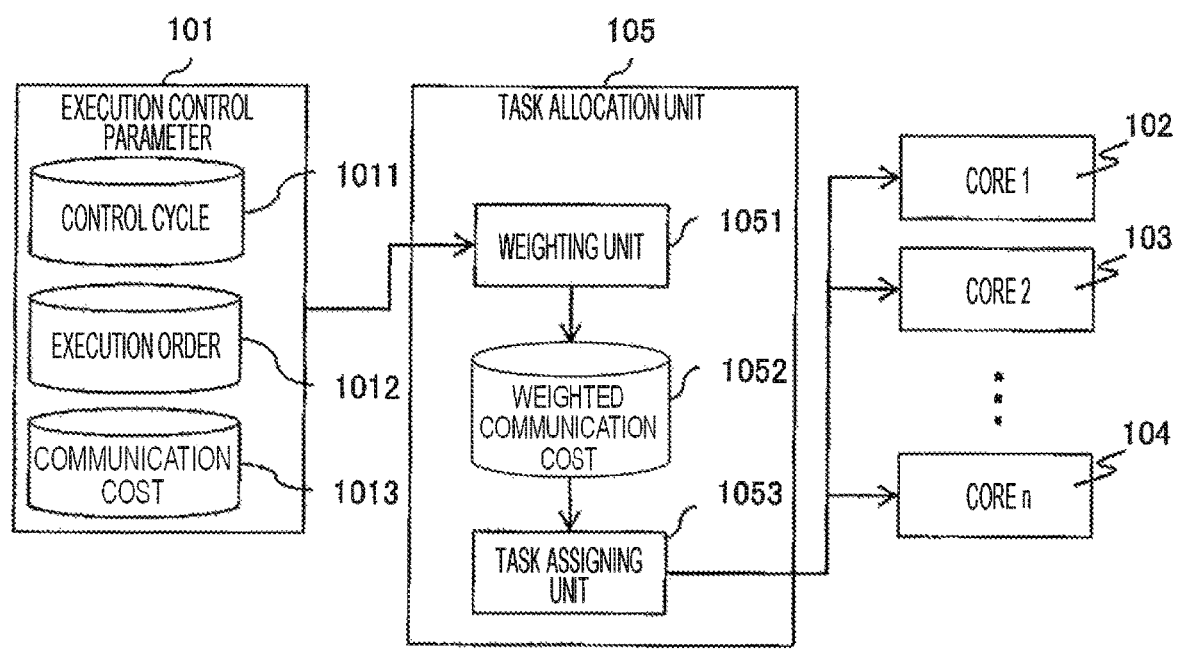
FIG. 3 is a diagram illustrating a detailed configuration of a task allocation unit 105.

FIG. 3 is a diagram illustrating a detailed configuration of the task allocation unit 105. The task allocation unit 105 includes a weighting unit 1051, a weighted communication cost 1052, and a task assignment unit 1053. The task allocation unit 105 acquires the execution control parameter 101 as input. The weighting unit 1051 performs weighting on the communication cost between the cores in accordance with the description of the execution control parameter 101 and creates the weighted communication cost 1052. The task assignment unit 1053 assigns the task to each of the cores in accordance with the weighted communication cost information 1052. A specific example of the weighting will be described later.

Figure 4:
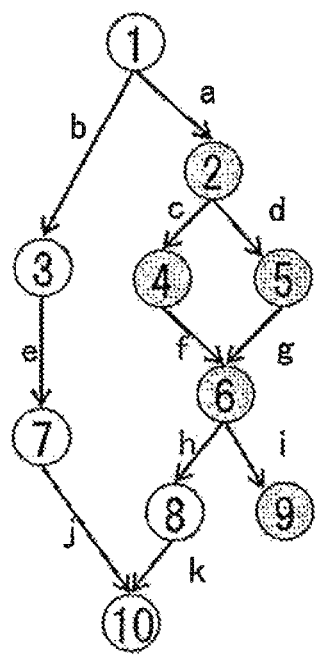
FIG. 4 is a diagram illustrating a specific example of an execution control parameter 101.

FIG. 4 is a diagram illustrating a specific example of the execution control parameter 101. The software to be executed by the vehicle control apparatus 1 includes tasks 1 to 10. The control cycle parameter 1011 describes each control cycle of the tasks, and the control cycles of 5 ms and 10 ms coexist as illustrated in FIG. 4. The execution order parameter 1012 describes each execution order of the tasks. For example, it is incapable of starting execution of the tasks 2 and 3 until processing of the task 1 is completed. The communication cost parameter 1013 describes the time required for the data communication between the cores. For example, when the task 1 and the task 2 are allocated to the different cores, 10 μs, which is a communication cost of a dependency a, is required as the communication cost in order to share data between the tasks 1 and 2. Since the communication cost is required only between the different cores, the communication cost in the case of allocating the tasks 1 and 2 to the same core, for example is zero.

Figure 5:
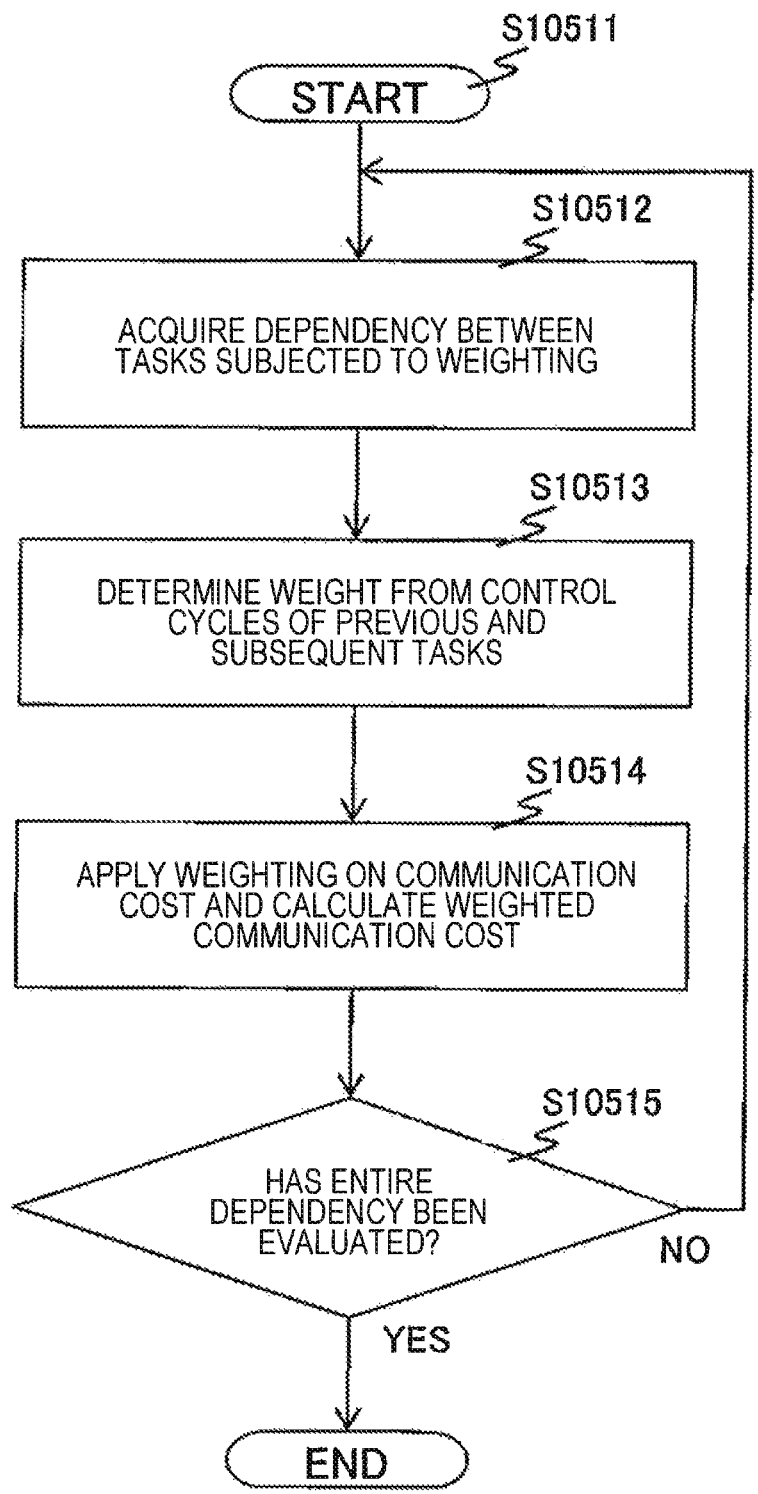
FIG. 5 is a flowchart for describing a process of a weighting unit 1051.

FIG. 5 is a flowchart for describing a process of the weighting unit 1051. Hereinafter, each step of FIG. 5 will be described.

(FIG. 5: Steps S10511 to S10512)

The weighting unit 1051 starts this flowchart when acquiring the execution control parameter 101 (S10511). The weighting unit 1051 acquires the dependency (the execution control parameter 101) between the tasks to be used for weighting (S10512).

(FIG. 5: Steps S10513 to S10514)

The weighting unit 1051 determines a weight with respect to the communication cost based on each control cycle of a previous task and a subsequent task having the dependency therebetween which is acquired in Step S10512 (S10513). A method of considering the weighting will be described later. The weighting unit 1051 performs weighting on the communication cost using the weight, which is determined in Step S10513 based on the dependency acquired in Step S10512, and calculates the weighted communication cost 1052.

(FIG. 5: Step S10515)

The weighting unit 1051 confirms whether the weighting has been completed with respect to the entire dependency among the tasks described in the execution control parameter 101. In the case of not being completed, the same process is repeated by returning to Step S10512. In the case of being completed, this flowchart is ended.

Figures 6, 7:
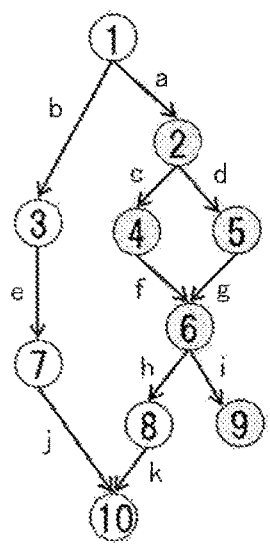
FIG. 6 is a diagram illustrating an example of a weight to be applied to a communication cost by the weighting unit 1051.
FIG. 7 is a diagram illustrating an example of a weighted communication cost 1052.

FIG. 6 is a diagram illustrating an example of the weight to be applied to the communication cost by the weighting unit 1051. The task assignment unit 1053 preferentially allocates the task having a higher weighted communication cost to the processor core as will be described later. Thus, the weighting unit 1051 applies a higher weight to a task that needs to be completed faster, that is, a task having a shorter control cycle.

In the example illustrated in FIG. 6, a greater weight is applied when the subsequent task having the dependency has a shorter control cycle (that is, the cycle of 5 ms) than when having a longer control cycle (that is, the cycle of 10 ms). Accordingly, the short-cyclic task is preferentially allocated to the processor core. Further, a greater weight is applied when the previous task in the dependent relationship has a shorter control cycle when having a longer control cycle. Accordingly, a plurality of the short-cyclic tasks tend to be allocated in a collective manner, and thus, it is possible to more reliably comply the deadline.

FIG. 7 is a diagram illustrating an example of the weighted communication cost 1052. When focusing on each dependency between tasks h and i, each communication cost before being weighted is 30 in the case of h and 10 in the case of i, and thus, the dependency h has a larger value. However, the dependency h has 90 and the dependency i has 100 regarding the weighted communication cost 1052 calculated by the weighting unit 1051, and thus, the dependency i has a larger value. This indicates that it is evaluated, as a result of performing the weighting, that the dependency i (the task 9) has a higher priority than the dependency h (the task 8) as a task candidate to be executed after ending the task 6. Accordingly, after ending the task 6, the task assignment unit 1053 allocates the task 9 to the processor core more preferentially than the task 8.

Figure 8:
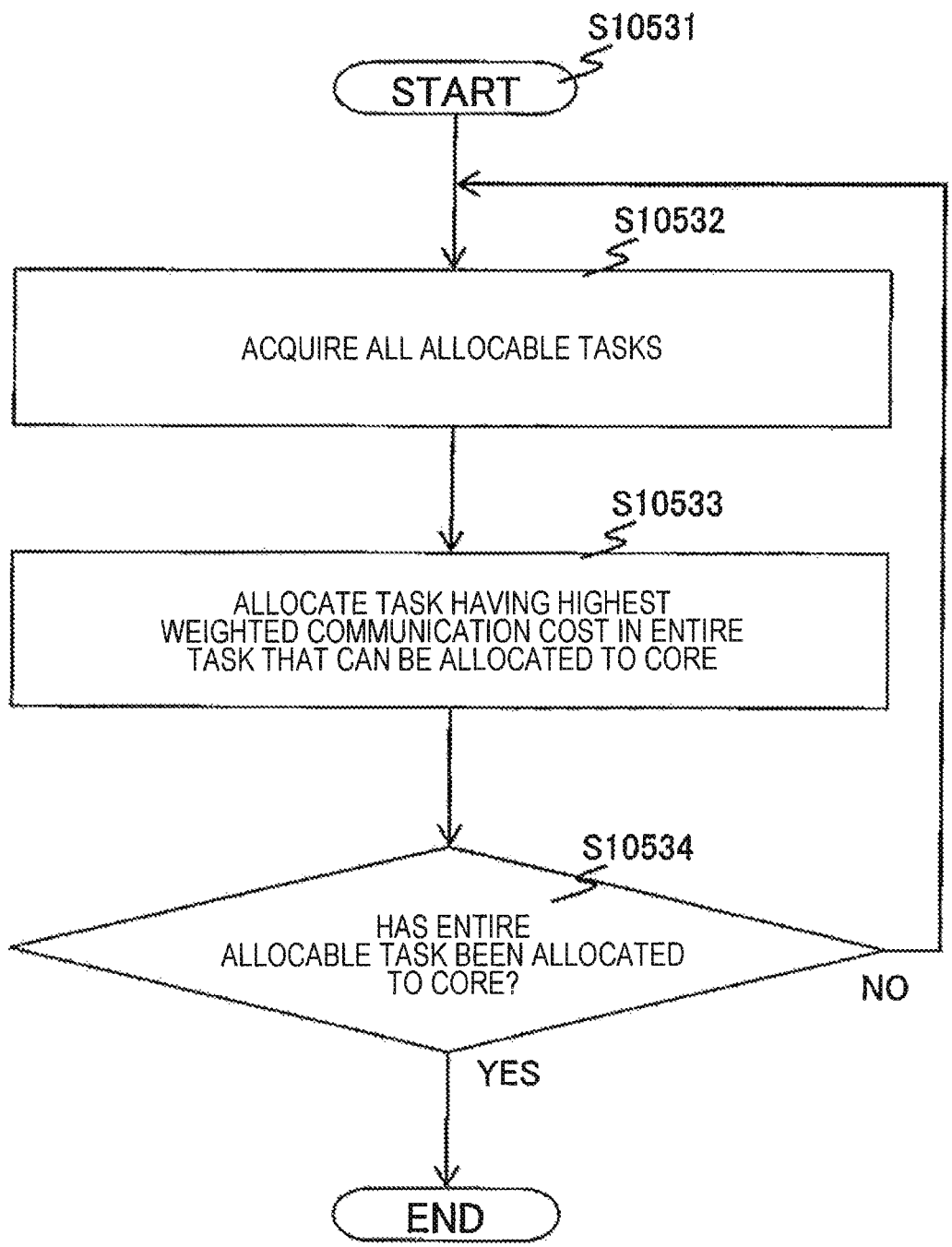
FIG. 8 is a flowchart for describing a process of a task assignment unit 1053.

FIG. 8 is a flowchart for describing a process of the task assignment unit 1053. Hereinafter, each step of FIG. 8 will be described.

(FIG. 8: Steps S10531 to S10532)

The task assignment unit 1053 starts this flowchart when the weighting unit 1051 ends the calculation of the weighted communication cost 1052 (S10531). The task assignment unit 1053 lists all allocable tasks (S10532). The allocable task indicates a task that can be subsequently allocated to the processor core in accordance with the dependency between the tasks described in the execution order parameter 1012.

(FIG. 8: Step S10533)

The task assignment unit 1053 allocates a task, which has a highest weighted communication cost among all the allocable tasks, to the processor core. When a task whose communication cost is zero and a task whose communication cost is not zero coexist among the allocable tasks, these tasks are allocated to different processor cores. It is because the task whose communication cost is zero is allocated to the same processor core as that of the immediately previous task, and the task whose communication cost is not zero is allocated to a different processor core from the immediately previous task. In this case, a task having a highest weighted communication cost among the tasks each of which communication cost is not zero may be preferentially allocated while allocating the task whose communication cost is zero to the different processor core in parallel. When there are a plurality of the tasks each of which communication cost is zero, a task having a greatest weight among them may be preferentially allocated.

(FIG. 8: Step S10534)

The task assignment unit 1053 conforms whether the entire allocable task has been allocated to the processor core. When there remains an allocated task, the same process is repeated by returning to Step S10532. When the entire task has been allocated, this flowchart is ended.

(FIG. 8: Steps S10531 to S10534: Supplement)

The task assignment unit 1053 may execute the task assignment, described in this flowchart, for example, only from the start of the vehicle control apparatus 1 until the processor starts execution of the task, may acquiring the execution control parameter 101 at a suitable time (for example, when a processor load is relatively small) after the processor starts the execution of the task and reallocate the tasks, or may execute the both in a combined manner.

Figure 9:
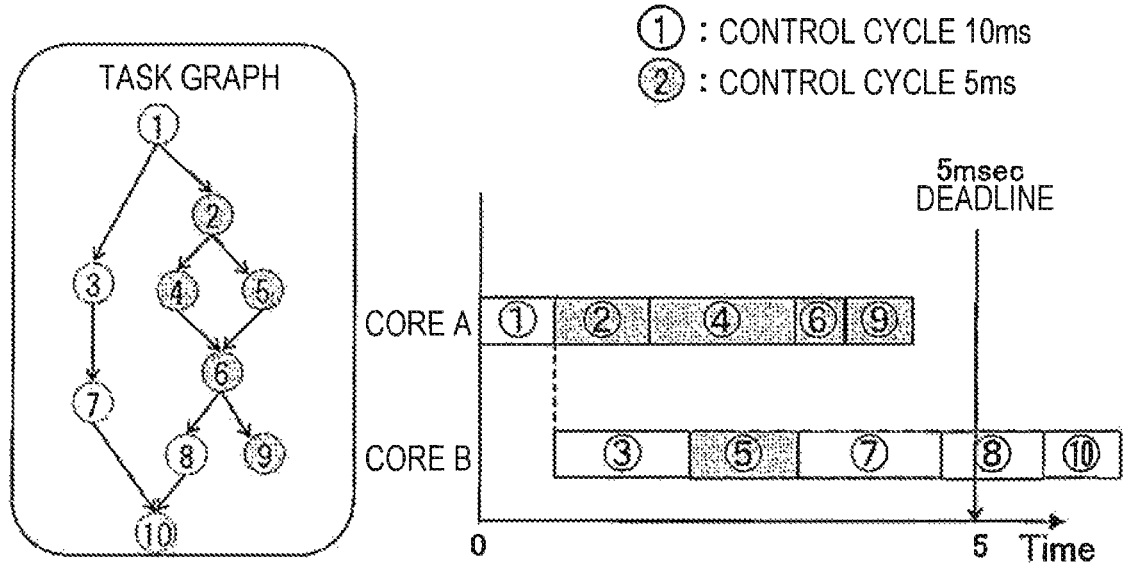
FIG. 9 is a schematic view illustrating a task allocation result obtained by the task assignment unit 1053.

FIG. 9 is a schematic view illustrating a task allocation result obtained by the task assignment unit 1053. As described with reference to FIG. 7, the task 9 has the higher weighted communication cost when comparing the tasks 8 and 9, which can be allocated after the task 6, and thus, the task 9 is preferentially allocated to the processor core. The core B executes the task 7 at a point in time when the task 6 is completed, and thus, the task 9 is allocated to the core A which is free. As a result, the entire task having the control cycle of 5 ms can be completed within the deadline.

FIG. 10 is a diagram illustrating an example of the execution log 201. The execution log 201 is a log that records a task that has been executed by each of the processor cores during operation of the vehicle control apparatus 1 and an execution time thereof. Each of the logs in the execution log 201 is not necessarily recorded as individual data, but can be recorded in a suitable format in view of convenience in description or the like. It is possible to grasp the execution time, the execution order, and a communication time of the program that has been executed by the vehicle control apparatus 1 from the execution log 201. For example, it is possible to use the execution log 201 for behavior analysis or debugging work of the program when an error occurs. The communication cost log 204 may describe an actual communication cost, the weighted communication cost, or the both.

When a record to a predetermined time from a specific time (for example, time at which the error occurs) needs to be stored, the processor of the vehicle control apparatus 1 repetitively records the execution log 201 in a specific storage area of the storage device 2. That is, when there is no free space of the storage area, the processor overwrites the oldest log in the storage area sequentially with a new log. Alternatively, when a record for a certain time from a specific time needs to be stored, the execution log 201 is recorded in the specific storage area of the storage device 2, and output of the log is stopped at a point in time when reaching a maximum limit of the free space of the storage area. When the free space of the storage device 2 is sufficient, the entire execution log 201 may be simply recorded without using the above-described methods.

Figure 11:
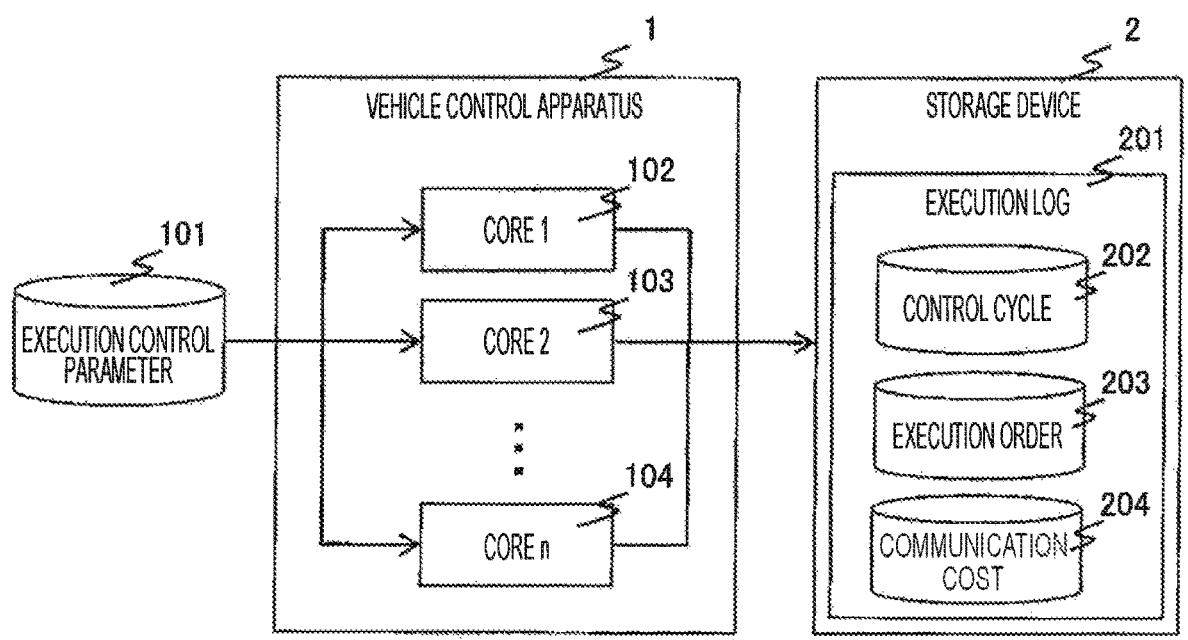
FIG. 11 is a system configuration diagram illustrating a modification example of the vehicle control apparatus 1.

FIG. 11 is a system configuration diagram illustrating a modification example of the vehicle control apparatus 1. The vehicle control apparatus 1 does not necessarily store the execution control parameter 101 therein, but may acquire the parameter from the outside. In the same manner, the storage device 2 may be provided inside the vehicle control apparatus 1 or may be configured as an external storage device. The execution control parameter 101 may be a data file format, or the execution control parameter 101 may be described using a suitable electrical signal.

CONCLUSION OF PRESENT INVENTION

As above, the vehicle control apparatus 1 according to the present invention allocates each of the tasks to the processor core while satisfying the constraints relating to the dependencies among the tasks and the execution cycles of each of the tasks in accordance with each description of the control cycle parameter 1011 and the execution order parameter 1012. Accordingly, it is possible to efficiently execute the task while satisfying the constraints even in the vehicle control software with the execution order constraint and the deadline constraint.

In addition, when the subsequent task having the dependency between the tasks is the short-cyclic task, the vehicle control apparatus 1 according to the present invention preferentially allocates this task to the processor core. Accordingly, the task having the Short control cycle can be reliably completed by the deadline.

The present invention is not limited to the above-described embodiment, and may include various modification examples. The above-described embodiment has been described in detail in order to facilitate the understanding of the present invention, and is not necessarily limited to one including the entire configuration described above. For example, it is also possible to use a method according to the present invention in a built-in system that performs electronic control of other household equipment, industrial equipment, medical equipment, and the like although the configuration example of the vehicle control apparatus has been described in the above-described embodiment.

Although the example in which there are the two control cycles including 5 ms and 10 ms has been given in the above-described embodiment, these numeric values are illustrative, and the present invention is not limited thereto. In addition, it is also possible to use the present invention when three or more types of control cycles coexist. For example, although the combination of the previous and subsequent tasks has been illustrated in FIG. 6 assuming the two types of control cycles, it is also possible to set the weight in the same manner regarding each combination when there are three or more types of control cycles. In this case, a greater weight may be applied to a task having a shorter control cycle with respect to both the previous task and the subsequent task.

Although it is assumed that the control cycle designated by the control cycle parameter 1011 is satisfied in the above-described embodiment, there is a task, among the tasks having a low priority, which does not have any trouble upon operation even when the control cycle thereof is not satisfied a certain number of times. It is not necessarily desirable to allocate such a task based only on the control cycle. Thus, each priority of the tasks may be described along with the control cycle parameter 1011, and the task allocation unit 105 may set the number of times, which is acceptable even if the control cycle is not satisfied (not counted as an error), to be larger in a task having a lower priority.

The configurations, the functions, the processing units, the processing means, and the like may be realized by hardware such as by designing a part of the components with an integrated circuit. A processor may interpret and execute programs for realizing the functions to realize the configurations, the functions, and the like, by software. Information, such as programs, tables, and files, for realizing the respective functions can be stored in a recording device, such as a memory, a hard disk, and a solid state drive (SSD), or in a recording medium, such as an IC card, an SD card, and a DVD.

REFERENCE SIGNS LIST 1 vehicle control apparatus
101 execution control parameter
1011 control cycle parameter
1012 execution order parameter
1013 communication cost parameter
102 to 104 processor core
105 task allocation unit
1051 weighting unit
1052 weighted communication cost
1053 task assignment unit
2 storage device
201 execution log
202 control cycle log
202 execution order log
203 communication cost log

The invention claimed is:
1. A vehicle control apparatus comprising:
a processor that includes a plurality of processor cores to execute tasks which control operations of a vehicle; and
a task allocation unit that allocates the tasks to the respective processor cores,
wherein the task allocation unit acquires an execution order parameter describing an execution order of the task, an execution cycle parameter describing an execution cycle of the task, and a communication cost parameter describing a communication cost, which is required for data communication between two of the processor cores, and allocates the tasks to the respective processor cores in accordance with each description of the execution order parameter, the execution cycle parameter, and the communication cost parameter,
the processor outputs an execution order log describing an order of the tasks executed by the respective processor cores, an execution cycle log describing a cycle of the task executed by the processor core, and a communication cost log describing a communication cost spent for data communication between the two processor cores,
wherein the task allocation unit sets, for each of the tasks, a number of times that is acceptable for a control cycle of the task to not be completed without counting the task as having an error,
wherein when there are a plurality of allocation candidates serving as candidates of the tasks allocable to the processor core in accordance with the execution order parameter, the task allocation unit allocates an alloca- tion candidate having the shorter execution cycle among the allocation candidates more preferentially, and wherein when there are the plurality of allocation candidates and none of the communication cost of each of the allocation candidates is zero, the task allocation unit applies a greater weight on the communication cost of a candidate having a shorter execution cycle among the allocation candidates, and allocates the allocation candidate having a higher communication cost after being weighted more preferentially to the processor core.

2. The vehicle control apparatus according to claim 1, wherein
the task allocation unit allocates the allocation candidate with the task, executed immediately prior to the corresponding allocation candidate, having the shorter execution cycle more preferentially to the processor core.

3. The vehicle control apparatus according to claim 1, wherein
the task allocation unit allocates the allocation candidate of which the communication cost is zero and the allocation candidate of which the communication cost is not zero to the processor cores, different from each other, in parallel.

4. The vehicle control apparatus according to claim 1, wherein
the execution cycle parameter describes a priority parameter describing each priority of the tasks, and
the task allocation unit performs the allocation such that the task having the lower priority, is not regarded as an error when not being completed within the execution cycle, a more number of times.

5. The vehicle control apparatus according to claim 1, wherein
the task allocation unit performs the allocation after start of the vehicle control apparatus until the processor starts execution of the task.

6. The vehicle control apparatus according to claim 5, wherein
the task allocation unit performs the allocation again by newly acquiring the execution order parameter, the execution cycle parameter, and the communication cost parameter after the processor starts the execution of the task after the start of the vehicle control apparatus.

7. The vehicle control apparatus according to claim 1, wherein
the processor stores the execution order log, the execution cycle log, and the communication cost log in a predetermined storage area on a storage device, and overwrites an oldest log sequentially with a new log when there is no free space in the predetermined storage area.

8. The vehicle control apparatus according to claim 1, wherein
the processor stores the execution order log, the execution cycle log, and the communication cost log in a predetermined storage area on a storage device, and stops output of the log when there is no free space in the predetermined storage area.

9. The vehicle control apparatus according to claim 1, wherein
the execution cycle parameter describes a deadline that specifies a last acceptable time as a time by which the task needs to be completed, and
the task allocation unit performs the allocation such that each of the tasks is completed by the time specified by the deadline at the latest.

* * * * *